No. 770,676. PATENTED SEPT. 20, 1904.
C. COOPER.
APPARATUS FOR WEIGHING LIQUIDS.
APPLICATION FILED MAY 23, 1904.
NO MODEL.
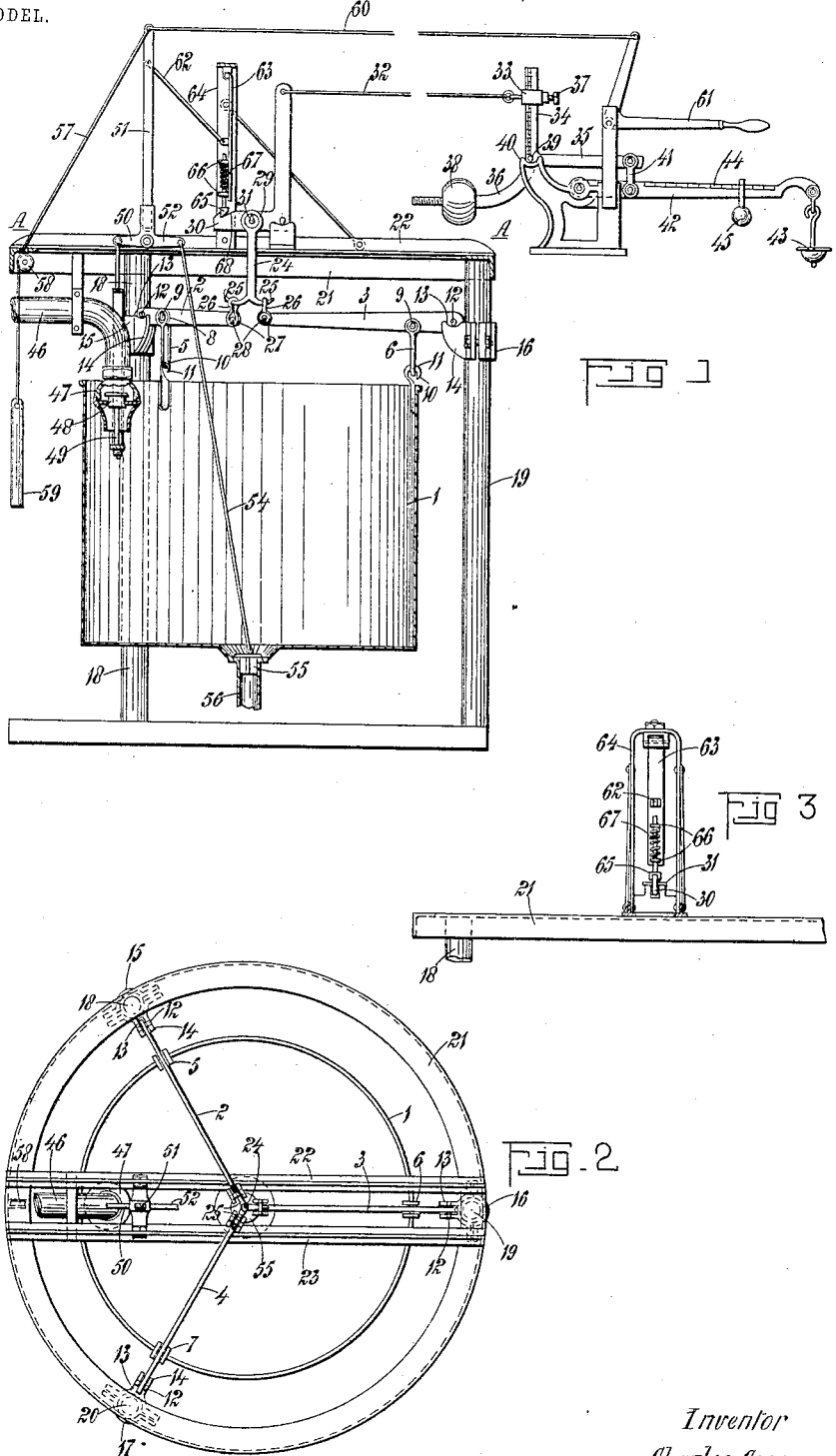
Witnesses:—
Keep Wilson
Frank Mowatt
Inventor
Charles Cooper
By Lepric H. Rayward
Attorney No. 770,676. Patented September 20, 1904.

UNITED STATES PATENT OFFICE.

CHARLES COOPER, OF MANGATOKI, NEW ZEALAND.

APPARATUS FOR WEIGHING LIQUIDS.

SPECIFICATION forming part of Letters Patent No. 770,676, dated September 20, 1904.

Application filed May 23, 1904. Serial No. 209,416. (No model.)

*To all whom it may concern:*

Be it known that I, CHARLES COOPER, a subject of His Majesty the King of Great Britain and Ireland, residing at Mangatoki, in the Provincial District of Taranaki, in the Colony of New Zealand, have invented new and useful Improvements in Apparatus for Weighing and Delivering Liquids, of which the following is a specification.

This invention provides improved apparatus for weighing liquids, and is more especially for use in dairy factories and the like for weighing and delivering skim-milk.

The apparatus comprises a vessel for the liquid which is suspended from lever-arms connected, through bell-crank levers and a rod or wire, with a system of levers terminating in a scale-arm upon which are the usual adjustable weights.

A valve controlling the supply of liquid to the vessel and a discharge-valve at the bottom of the vessel are connected to valve-levers which are simultaneously operated to close one valve and open the other. A vertical lever integral with the valve-levers is connected by a rod or wire with a hand-lever arranged near the scale-arm. A balance-weight normally tends to operate the vertical lever in the direction to open the discharge-valve and close the supply-valve; but the lever is retained vertically by a rod connecting it with a pivoted spring-catch which engages with a notch in a bell-crank lever pivoted above and supporting the vessel. When the amount of liquid admitted to the vessel is sufficient to overbalance the scale-arm, the vessel descends and operates the said bell-crank lever, whereby the catch is released and the lever set free to the action of the balance-weight to close the supply and open the delivery valves.

I will now more particularly describe my invention by the aid of the accompanying drawings, wherein—

Figure 1 is a central sectional side elevation; Fig. 2, a sectional plan on A A, Fig. 1; and Fig. 3, an end elevation of part of the apparatus.

The vessel 1 is supported from the levers 2, 3, and 4 by links 5, 6, and 7, having ring jaws 8 at their upper ends receiving triangular pivot-pieces 9 upon the lever and eyes 10 at their lower ends, which receive hooks 11, fixed upon the upper part of the vessel. The outer end of each of the levers 2, 3, and 4 has a knife-edge pivot 12, which rests in a notch 13 in ears 14, with which each of the bearer-brackets 15, 16, and 17 is provided. The bearer-brackets are clamped upon the vertical pillars 18, 19, and 20, which are connected by the angle-ring 21 and support the cross-beams 22 and 23.

The suspending-rod 24 has a triple hook 25 at its lower end, each hook supporting the inner end of one of the levers 2, 3, and 4 through the medium of a pivoted link 26. Each of the links 26 has a ring jaw 27 at its lower end, which receives a triangular pivot-piece 28, with which the end of each lever is provided. The upper end of the rod 24 has a ring jaw 29, the jaw receiving the bell-crank lever 30 and the rings thereof a triangular pivot-piece 31, passing through the bell-crank lever. The upper end of the bell-crank lever is connected by a wire 32 with the socket 33, sliding upon the arm 34 of a lever 35, which has also the arm 36. A set-pin 37 in the socket permits it to be secured in any position upon the arm 34. The arm 36 is screw-threaded, and a balance-weight 38 is adjustable thereon. The lever 35 is mounted upon a pivot-pin 39 in a bracket 40 and is connected at its outer end by the pivoted link 41 with the scale-arm 42, which is pivoted at its inner end in the bracket 40, has the weight-pan 43 at its outer end, and has scale-markings 44 and an adjustable weight 45.

Liquid is admitted to the vessel 1 from a main pipe 46 through a valve-chamber 47, which has a valve 48, pivotally connected by a rod 49 with the arm 50 of a lever 51, which is pivoted in bearings in the cross-beams 22 and 23 and has another arm, 52, opposite to the arm 50. Arm 52 is pivotally connected by a rod 54 with a delivery-valve 55, through which milk is discharged from the vessel 1 into a pipe 56, leading to a receptacle. Lever 51 is connected by a flexible wire 57, passing over a guide-sheave 58, with a balance-weight 59 and is also connected by a wire 60 with a bell-crank hand-lever 61, pivoted in bracket 40. A rod 62 pivotally connects lever 51 with a swinging bar 63, which is pivoted at its upper end in a bracket 64, carried upon the cross-beams 22 and 23, and has the bolt 65 slidable upon the bar 63 through bearings 66 and normally projected by a coil-spring 67. A notch 68 in the lever 30 receives the end of the bolt 65.

In butter factories it is customary to deliver back to milk-suppliers skim-milk equal in weight to the "whole" milk supplied to the factory by them less a certain percentage equal to the amount of butter-fat which has been extracted from the milk. In operation, therefore, the socket 33 is adjusted upon the arm 34 according to the percentage of weight to be deducted from a given amount of milk, the arm having graduated markings upon it for the purpose. The required weight is then placed upon the weight-pan 43 and the weight 45 adjusted upon the arm 42 after the manner of an ordinary scale. The balance-weight 38 is then adjusted to bring the scale-arm 42 into horizontal position and the hand-lever 61 pulled down, whereby the lever 51 is drawn up against the action of the balance-weight 59, the bolt 65 passing into engagement with the notch 68, the valve 55 closed, and the valve 48 opened to the supply of milk to the vessel 1. When the due weight of milk causes the vessel to descend, the lever 30 is drawn down, the bolt 65 is thereby released, and the lever 51 allowed to vibrate under the influence of the balance-weight 59, the supply-valve 48 being closed and the delivery-valve 55 opened.

Having now particularly described and ascertained the nature of my said invention and in what manner the same is to be performed, I declare that what I claim is—

1. For the purpose indicated in combination, a vessel 1, a pipe 46 supplying liquid thereto, a valve 48 thereon, a discharge-valve 55 in the bottom of the vessel, valve-levers 50 and 52 to which the said valves are severally connected, a lever 51 integral with said valve-levers, a balance-weight 59, means for connecting it to the lever 51, a bell-crank hand-lever 61 and means for connecting it with the lever 51, a pivoted swing-bar 63, a sliding bolt 65 at the lower end thereof and a rod 62 pivotally connecting the swing-bar with said main lever; pivotally-mounted levers 2, 3 and 4 with means for suspending the vessel therefrom, a suspending-rod 24 having hooks from which the lever-arms are suspended, a pivoted bell-crank lever 30 from which the suspending-rod is pivotally supported, said bell-crank lever having a notch to receive the end of said bolt, a socket 33 adjustable upon the arm 34 of lever 35, means for connecting said bell-crank lever 30 with the socket, the lever 35 with means for pivotally connecting its outer end with a pivoted graduated scale-arm 42 and weights for use upon said scale-arm, substantially as specified and illustrated.

2. For the purpose indicated in combination, the vessel 1, the bell-crank lever 30 means for suspending the vessel from said bell-crank lever, the socket 33, means for connecting it with said bell-crank lever, the lever 35 and arm 34 integral therewith the arm 36 and balance-weight 38 thereon, the pivoted scale-arm 42 and means for pivotally connecting it with lever 35 and weights for use upon the scale-arm substantially as specified and illustrated.

In testimony whereof I have signed my name to this specification in the presence of two subscribing witnesses.

CHARLES COOPER.

Witnesses:
H. E. S. BALDWIN,
KEEP WILSON.